US008856599B2

(12) United States Patent
Itogawa

(10) Patent No.: US 8,856,599 B2
(45) Date of Patent: Oct. 7, 2014

(54) TROUBLE PREDICTION APPARATUS, TROUBLE PREDICTION METHOD, AND COMPUTER PROGRAM PRODUCT

(75) Inventor: Akira Itogawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 234 days.

(21) Appl. No.: 13/406,967

(22) Filed: Feb. 28, 2012

(65) Prior Publication Data
US 2012/0226948 A1 Sep. 6, 2012

(30) Foreign Application Priority Data

Mar. 1, 2011 (JP) ................................. 2011-044337

(51) Int. Cl.
*G06F 11/00* (2006.01)
*G03G 15/00* (2006.01)
*H04N 1/00* (2006.01)

(52) U.S. Cl.
CPC .......... *G06F 11/008* (2013.01); *G03G 15/5079* (2013.01); *H04N 1/00068* (2013.01); *H04N 2201/0094* (2013.01); *H04N 1/00344* (2013.01)
USPC ...................................................... 714/47.3

(58) Field of Classification Search
CPC ... G06F 1/00; G06F 2003/00; G06F 2101/00; G06F 2200/00; G06F 2201/00
USPC ......................................................... 714/47
See application file for complete search history.

(56) References Cited

U.S. PATENT DOCUMENTS

| 5,225,873 | A | * | 7/1993 | Lux et al. ......................... 399/26 |
| 5,923,834 | A | * | 7/1999 | Thieret et al. .................... 714/25 |
| 6,282,687 | B1 | * | 8/2001 | Maeda et al. ................... 714/763 |
| 7,962,319 | B2 | * | 6/2011 | Grayson ........................... 703/10 |
| 8,472,818 | B2 | * | 6/2013 | Yamane et al. ................... 399/26 |
| 2011/0007337 | A1 | * | 1/2011 | Imazeki et al. ............... 358/1.14 |
| 2011/0170134 | A1 | * | 7/2011 | Murashima .................. 358/1.15 |

FOREIGN PATENT DOCUMENTS

| EP | 2154576 | * | 2/2010 | ............. G03G 15/00 |
| JP | 2009-55701 | | 3/2009 | |
| JP | 2009-55703 | | 3/2009 | |
| JP | 2010-101948 | | 5/2010 | |
| JP | 2010-211417 | | 9/2010 | |
| JP | 2010-211418 | | 9/2010 | |

* cited by examiner

*Primary Examiner* — Amine Riad
(74) *Attorney, Agent, or Firm* — Oblon, Spivak, McClelland, Maier & Neustadt, L.L.P.

(57) ABSTRACT

A trouble prediction apparatus includes a trouble-occurred device information storage unit that stores therein trouble occurrence information of trouble-occurred devices in which a trouble has occurred out of a plurality of management target devices; a calculating unit that calculates a trouble occurrence probability based on the trouble occurrence information; and a predicting unit that predicts a trouble of a prediction target device out of the management target devices by referring to the trouble occurrence probability.

16 Claims, 10 Drawing Sheets

FIG.2

```
MANAGEMENT TARGET DEVICE INFORMATION:
· DEVICE ID
· MODEL INFORMATION
· INSTALLATION DATE
```

FIG.3

```
TROUBLE-OCCURRED
DEVICE INFORMATION:
· DEVICE ID
· MODEL INFORMATION
· TROUBLE TYPE INFORMATION
· TROUBLE-OCCURRED DATE
```

FIG.4

```
TROUBLE OCCURRENCE PROBABILITY INFORMATION:
· MODEL INFORMATION
· TROUBLE TYPE INFORMATION
· COEFFICIENTS OF EXPRESSION CONCERNING
TROUBLE OCCURRENCE PROBABILITY
```

STAFF MEMBER INFORMATION:
· MAIL ADDRESS
· DEVICE ID

FIG.7

To: Maintenance staff XX:
The following devices are predicted to have a trouble in the fixing unit in near future. Conducting their checkups is suggested.

Business Place AA: R112233
Business Place AA: S233445
Business Place BB: U321098

FIG.8

To: Maintenance staff XX:
The following devices have a possibility of trouble in the fixing unit. Conducting their checkups is recommended.

Business Place AA: R112234
Business Place BB: X432098
...

TOTAL PRINT PAGE INFORMATION:
· DEVICE ID
· TOTAL NUMBER OF PRINT PAGES
· TRANSMISSION DATE

TROUBLE PREDICTION APPARATUS, TROUBLE PREDICTION METHOD, AND COMPUTER PROGRAM PRODUCT

CROSS-REFERENCE TO RELATED APPLICATIONS

The present application claims priority to and incorporates by reference the entire contents of Japanese Patent Application No. 2011-044337 filed in Japan on Mar. 1, 2011.

BACKGROUND OF THE INVENTION

1. Field of the Invention

The present invention relates to a trouble prediction apparatus, a trouble prediction method, and a computer program product.

2. Description of the Related Art

Conventionally known are techniques to predict a trouble time of an image forming apparatus such as a copying machine. For example, Japanese Patent Application Laid-open No. 2010-101948 discloses a technique for predicting a trouble of a processing unit in a color image forming apparatus by detecting the amount of toner attached onto patch images using optical sensors.

However, the conventional techniques as described above cannot predict a trouble without special hardware, such as sensors, incorporated in the apparatus for trouble detection.

Therefore, there are needs for a trouble prediction apparatus and a trouble prediction method capable of predicting a trouble without incorporating any hardware for trouble detection in a device.

In this document, trouble prediction includes the prediction of a failure, fault, error, trouble, or other problem or issue.

SUMMARY OF THE INVENTION

According to an embodiment, there is provided a trouble prediction apparatus that includes a trouble-occurred device information storage unit that stores therein trouble occurrence information of trouble-occurred devices in which a trouble has occurred out of a plurality of management target devices; a calculating unit that calculates a trouble occurrence probability based on the trouble occurrence information; and a predicting unit that predicts a trouble of a prediction target device out of the management target devices by referring to the trouble occurrence probability.

According to another embodiment, there is provided a trouble prediction method performed in a trouble prediction apparatus that includes a trouble-occurred device information storage unit, a calculation unit, and a predicting unit. The method includes acquiring, by the calculating unit, trouble occurrence information from the trouble-occurred device information storage unit that stores therein the trouble occurrence information of trouble-occurred devices in which a trouble has occurred out of a plurality of management target devices; calculating, by the calculating unit, a trouble occurrence probability based on the trouble occurrence information; and predicting, by the predicting unit, a trouble of a prediction target device out of the management target devices by referring to the trouble occurrence probability.

According to still another embodiment, there is provided a computer program product including a non-transitory computer-readable medium including computer-readable program codes embodied in the medium for predicting a trouble of a device. The program codes, when executed by a computer, cause the computer to execute acquiring trouble occurrence information from a trouble-occurred device information storage unit that stores therein the trouble occurrence information of trouble-occurred devices in which a trouble has occurred out of a plurality of management target devices; calculating a trouble occurrence probability based on the trouble occurrence information; and predicting a trouble of a prediction target device out of the management target devices by referring to the trouble occurrence probability.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram illustrating an example of management target device information in the first embodiment;

FIG. 3 is a diagram illustrating an example of trouble-occurred device information in the first embodiment;

FIG. 4 is a diagram illustrating an example of trouble occurrence probability information in the first embodiment;

FIG. 7 is a diagram illustrating an example of mail content in the first embodiment;

FIG. 8 is a diagram illustrating an example of mail content in the first embodiment;

DETAILED DESCRIPTION OF THE PREFERRED EMBODIMENTS

With reference to the accompanying drawings, exemplary embodiments will be described in detail below.

First Embodiment

The configuration of a trouble prediction system according to a first embodiment will be described first.

Figure 1:
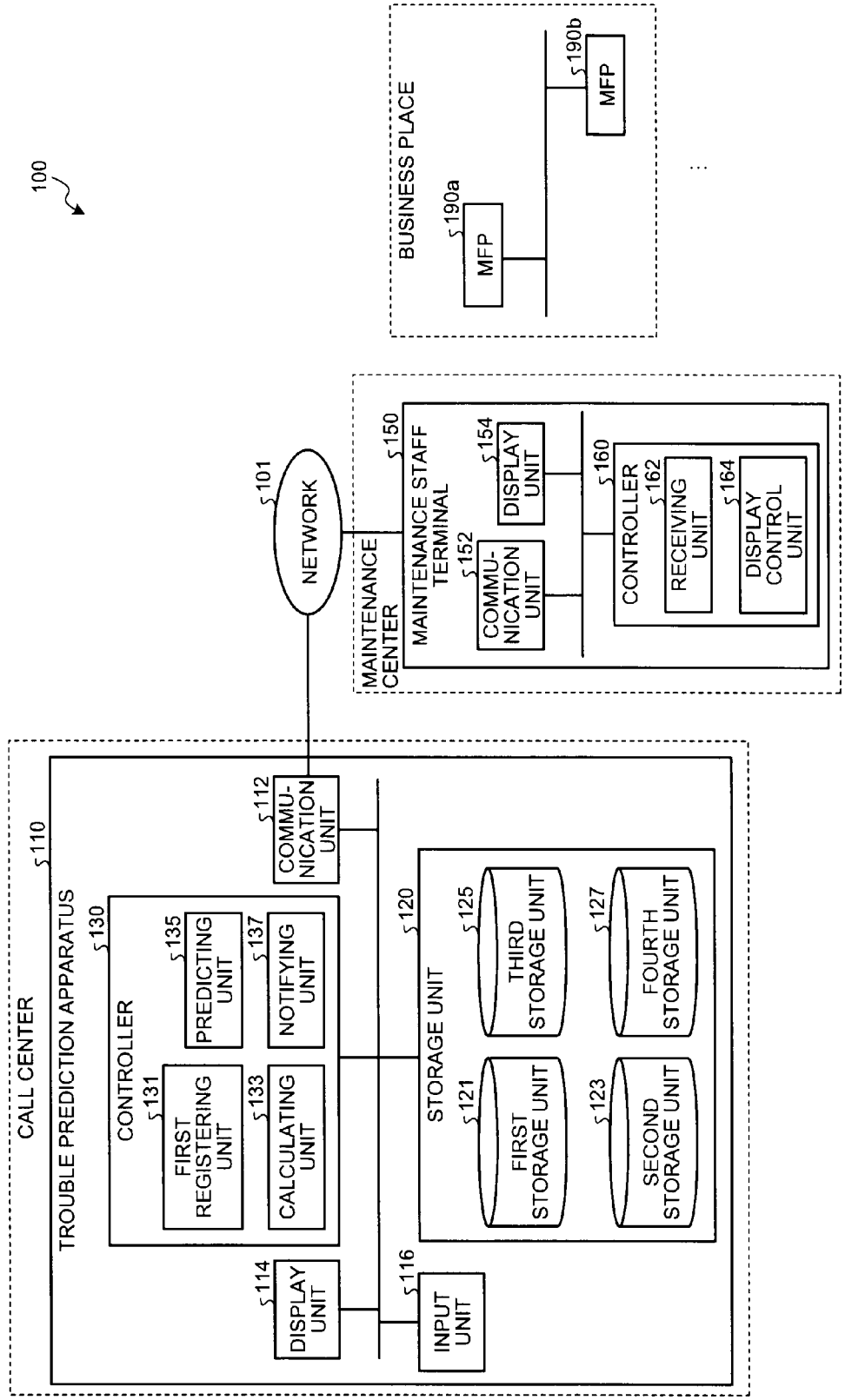
FIG. 1 is a schematic block diagram illustrating an example of a configuration of a trouble prediction system according to a first embodiment.

FIG. 1 is a schematic block diagram illustrating an example of a configuration of a trouble prediction system 100 of the first embodiment. As illustrated in FIG. 1, the trouble prediction system 100 includes a trouble prediction apparatus 110 and a maintenance staff terminal 150. The trouble prediction apparatus 110 and the maintenance staff terminal 150 are connected with each other via a network 101. The network 101 may be, for example, a public communication channel and a specific communication channel (a leased line).

The trouble prediction apparatus 110 is a server installed in a call center that supports for telephone inquiries from a staff member in a business place, and manages device information and trouble information of an image forming apparatus such as a printer, a copying machine, an MFP, or a facsimile installed in the business place. The business place is not limited to an office such as a head office, a branch office, a sales office, or a business office, and it only needs to be a space (place) where an image forming apparatus is installed. The MFP is an apparatus that has at least two functions of a copy function, a print function, a scanner function, and a facsimile function. In the example illustrated in FIG. 1, MFPs 190a and 190b installed in a single business place are depicted. However, the trouble prediction apparatus 110 manages not only the device information and the trouble information of the MFPs 190a and 190b, but also the device information and the trouble information of a plurality of image forming apparatuses installed in a plurality of business places.

The trouble prediction apparatus 110, as illustrated in FIG. 1, includes a communication unit 112, a display unit 114, an input unit 116, a storage unit 120, and a controller 130.

The communication unit 112 communicates with an external device such as the maintenance staff terminal 150 via the network 101, and can be implemented by an existing communication device such as a communication interface.

The display unit 114 displays various screens, and may be implemented, for example, by an existing display device such as a touch screen display and a liquid crystal display.

The input unit 116 receives various operation inputs, and may be implemented, for example, by at least any of existing display devices such as a touch screen display, a mouse, and a keyboard. The display unit 114 and the input unit 116 may be implemented in an integrated manner by a touch screen display and the like.

The storage unit 120 stores therein various programs to be executed in the trouble prediction apparatus 110, data used for various processes performed by the trouble prediction apparatus 110, and the like. The storage unit 120 may be implemented, for example, by at least any of existing storage devices that store the foregoing magnetically, optically, or electrically such as a hard disk drive (HDD), a solid state drive (SSD), a memory card, an optical disk, a read only memory (ROM), and a random access memory (RAM). The storage unit 120 includes a first storage unit 121, a second storage unit 123, a third storage unit 125, and a fourth storage unit 127.

The first storage unit 121 stores therein device information on management target image forming apparatuses (hereinafter, referred to as "management target device information") that are managed by the trouble prediction apparatus 110. More specifically, the first storage unit 121 stores therein the management target device information in which device identification information uniquely identifying each of a plurality of management target image forming apparatuses is associated with installation information of a corresponding one of the management target image forming apparatuses. The install information includes installation time information indicative of an installation time. The installation time, for example, is a point of time at which an image forming apparatus is installed (delivered) in a business place. The management target device information further includes model information indicative of the model of each of the management target image forming apparatuses so as to be associated with the device identification information.

FIG. 2 is a diagram illustrating an example of management target device information in the first embodiment. In the example illustrated in FIG. 2, the management target device information includes a device ID (an example of the device identification information), the model information, and an installation date (an example of installation time information) of the management target image forming apparatus so as to be associated with one another.

The second storage unit 123 stores therein trouble information (ticket) of trouble-occurred image forming apparatuses in which a trouble has occurred out of the management target image forming apparatuses managed by the trouble prediction apparatus 110. The second storage unit 123 stores therein trouble occurrence information of each of a plurality of trouble-occurred image forming apparatuses out of the management target image forming apparatuses. The trouble occurrence information includes trouble occurrence time information indicative of a trouble occurrence time. More specifically, the second storage unit 123 stores therein the trouble occurrence information in which device identification information uniquely identifying each of the trouble-occurred image forming apparatuses is associated with the trouble occurrence time information. The trouble occurrence information further includes model information of each of the trouble-occurred image forming apparatuses so as to be associated with the device identification information. The trouble occurrence information further includes trouble type information indicative of the trouble type of the trouble-occurred image forming apparatus so as to be associated with the device identification information of the trouble-occurred image forming apparatus.

FIG. 3 is a diagram illustrating an example of trouble-occurred device information in the first embodiment. In the example illustrated in FIG. 3, the trouble-occurred device information includes a device ID, model information, trouble type information, and a trouble-occurred date (an example of trouble occurrence time information) of a trouble-occurred image forming apparatus so as to be associated with one another.

The third storage unit 125 stores therein trouble occurrence probabilities for each model and each trouble type calculated by the controller 130 which will be described later. FIG. 4 is a diagram illustrating an example of trouble occurrence probability information in the first embodiment. In the example illustrated in FIG. 4, the trouble occurrence probability information includes model information, trouble type information, and coefficients of an expression concerning the trouble occurrence probability so as to be associated with one another.

Figures 5, 6:
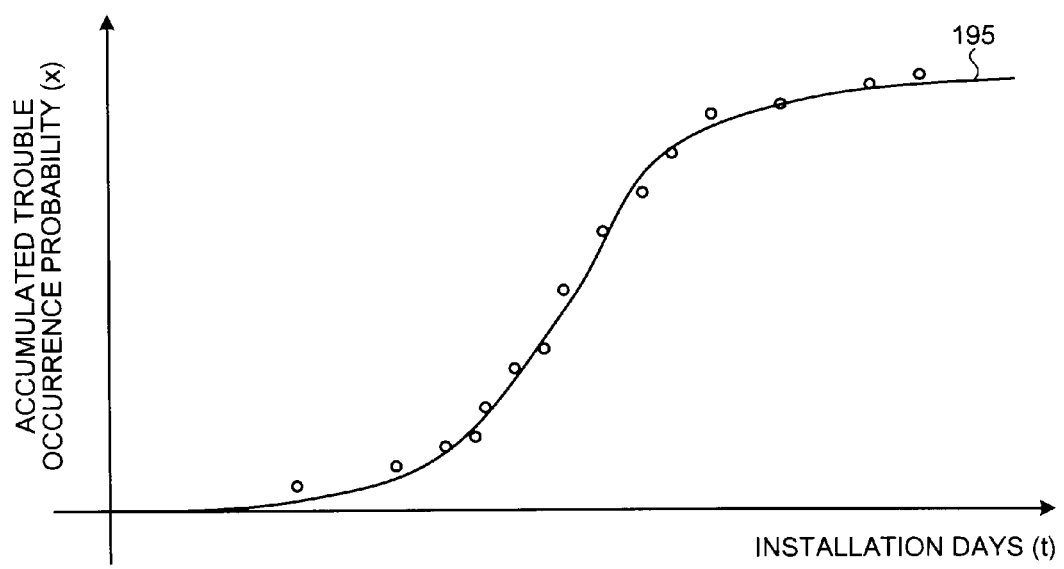
FIG. 5 is a diagram illustrating an example of maintenance staff information in the first embodiment.
FIG. 6 is a graph illustrating an example of a logistic curve in the first embodiment.

The fourth storage unit 127 stores therein the information of a maintenance staff (service representative) who carries out service (maintenance) of a management target image forming apparatus managed by the trouble prediction apparatus 110. FIG. 5 is a diagram illustrating an example of staff member information in the first embodiment. In the example illustrated in FIG. 5, the staff member information includes a mail address of a maintenance staff and a device ID of a management target image forming apparatus on which the maintenance staff carries out the maintenance so as to be associated with each other.

The controller 130 controls the respective units of the trouble prediction apparatus 110, and is implemented by an existing control device such as a central processing unit (CPU). The controller 130 includes a first registering unit 131, a calculating unit 133, a predicting unit 135, and a notifying unit 137.

The first registering unit 131 receives an input of device identification information and trouble occurrence information of a trouble-occurred image forming apparatus from the input unit 116, and registers the device identification information and the trouble occurrence information thus received to the second storage unit 123 so as to be associated with each other.

More specifically, an operator in a call center uses the input unit 116 to input a device ID, model information, trouble type information, and a trouble-occurred date of a trouble-occurred image forming apparatus received through a telephone inquiry from a staff member in a business place to the trouble prediction apparatus 110. Accordingly, the first registering unit 131 receives the device ID, the model information, the trouble type information, and the trouble-occurred date of the trouble-occurred image forming apparatus from the input unit 116, and registers the device ID, the model information, the trouble type information, and the trouble-occurred date received to the second storage unit 123 so as to be associated with one another.

When the operator of the call center inputs the device ID, the model information, the trouble type information, and the trouble-occurred date of the trouble-occurred image forming apparatus to the trouble prediction apparatus 110, the operator finds out a maintenance staff of the trouble-occurred image forming apparatus from the fourth storage unit 127 with the device ID as a key, and gives instructions to the maintenance staff to carry out the maintenance, for example, by mail.

The calculating unit 133 calculates a trouble occurrence probability based on each piece of trouble occurrence time information. More specifically, the calculating unit 133 calculates a trouble occurrence probability based on the trouble occurrence time information of each of the trouble-occurred image forming apparatuses and the installation time information corresponding to the device identification information. The calculating unit 133 then registers the calculated trouble occurrence probability to the third storage unit 125. The calculating unit 133 calculates the trouble occurrence probability periodically. The calculating unit 133 further calculates, for each model, the trouble occurrence probability based on the model information of each of the trouble-occurred image forming apparatuses. The calculating unit 133 further calculates, for each trouble type, the trouble occurrence probability based on the trouble type information of each of the trouble-occurred image forming apparatuses. In more detail, the calculating unit 133 uses the trouble occurrence time information of each of the trouble-occurred image forming apparatuses and the installation time information corresponding to the device identification information to calculate a non-trouble period up to trouble occurrence for each of the trouble-occurred image forming apparatuses, and uses each of the calculated non-trouble periods to calculate an accumulated trouble occurrence probability with respect to an installation period. While the calculating unit 133 calculates a logistic curve as the accumulated trouble occurrence probability with respect to the installation period in the embodiment, it is not limited thereto.

A method of calculating a logistic curve that is the accumulated trouble occurrence probability with respect to installation period in the embodiment will be specifically explained below.

To calculate a logistic curve, the calculating unit 133 acquires a device ID, model information, trouble type information, and a trouble-occurred date of a trouble-occurred image forming apparatus from the second storage unit 123, and further acquires an installation date associated with the device ID of the management target image forming apparatus that matches the device ID of the trouble-occurred image forming apparatus from the first storage unit 121. The calculating unit 133 then carries out the following computation to thereby calculate logistic curves for each model specified by the model information and for each trouble type specified by the trouble type information.

First, the calculating unit 133 picks up a plurality of trouble-occurred image forming apparatuses whose model specified by the model information and trouble type specified by the trouble type information match with one another. The calculating unit 133 then calculates the number of non-trouble days (an example of a non-trouble period) of each of the trouble-occurred image forming apparatuses from the installation to trouble occurrence based on the installation date and the trouble-occurred date of the respective trouble-occurred image forming apparatuses thus picked up, and calculates histograms of the number of trouble-occurred apparatuses (the number of trouble occurrences) using the calculated number of non-trouble days as the number of installation days during which the prediction target image forming apparatus is installed.

Then, the calculating unit 133 adds up the calculated histograms with respect to the number of installation days to obtain plots of accumulated numbers of trouble-occurred apparatuses for the number of installation days.

The calculating unit 133 then divides the accumulated numbers of trouble-occurred apparatuses by the total number of trouble-occurred image forming apparatuses picked up to thereby obtain plots of an accumulated trouble occurrence probability.

Subsequently, the calculating unit 133 uses, for example, a least square method to calculate a logistic curve that most appropriately fits the plots of the accumulated trouble occurrence probability. The calculating unit 133 then registers the model information indicative of model and the trouble type information indicative of the trouble type of the trouble-occurred image forming apparatuses picked up to the third storage unit 125 so as to be associated with coefficients of the calculated logistic curve.

FIG. 6 is a graph illustrating an example of a logistic curve 195 in the first embodiment. In the example illustrated in FIG. 6, the logistic curve 195 calculated by the calculating unit 133 is expressed by Expression (1).

$$x = a/(1 + b \times \exp(-c \times t)) \qquad (1)$$

In this case, the calculating unit 133 registers, to the third storage unit 125, the model information and the trouble type information so as to be associated with coefficients a, b, and c of the logistic curve 195.

The predicting unit 135 refers to the trouble occurrence probability calculated by the calculating unit 133 to predict a trouble of a prediction target image forming apparatus out of the management target image forming apparatuses. The predicting unit 135 predicts a trouble of the prediction target image forming apparatus periodically. The predicting unit 135 further refers to the trouble occurrence probability of the model specified by the model information of the prediction target image forming apparatus to predict a trouble of the prediction target image forming apparatus. The predicting unit 135 further refers to the trouble occurrence probability of the trouble type to predict a trouble of the prediction target image forming apparatus. More specifically, the predicting unit 135 calculates an installation period of a prediction target image forming apparatus at the time of trouble prediction from the installation time information of the prediction target image forming apparatus, and then applies the calculated installation period of the prediction target image forming apparatus to the accumulated trouble occurrence probability calculated by the calculating unit 133 so as to predict a trouble of the prediction target image forming apparatus.

The trouble prediction method of the prediction target image forming apparatus in the embodiment will be specifically explained below.

The predicting unit 135 first acquires, from the third storage unit 125, the coefficients a, b, and c of the logistic curve 195 associated with the model information indicative of the model of each of the prediction target image forming apparatuses and the trouble type information indicative of the trouble type of each of the prediction target image forming apparatuses, and reproduces the logistic curve 195 (see FIG. 6).

The predicting unit 135 then acquires the installation date of each of the prediction target image forming apparatuses from the first storage unit 121, and acquires the date at the time of trouble prediction, i.e., the current time. Alternatively, the predicting unit 135 may use the time measured by the trouble prediction apparatus 110 as the date at the time of trouble prediction, or the time acquired from an external server (omitted to be illustrated) and such may be used as the date at the time of trouble prediction. The predicting unit 135 then calculates, as the installation period of each of the prediction target image forming apparatuses, the number of installation days during which each of the prediction target image forming apparatus is installed based on the respective installation dates and the date at the time of trouble prediction.

The predicting unit 135 then applies each of the calculated number of installation days to the reproduced logistic curve 195 so as to obtain the accumulated trouble occurrence probability corresponding to the number of installation days of each of the prediction target image forming apparatuses. The predicting unit 135 then extracts the prediction target image forming apparatuses whose accumulated trouble occurrence probability thus obtained is within a predetermined range.

The notifying unit 137 gives a notice based on the trouble prediction result by the predicting unit 135 to, for example, the maintenance staff terminal 150. More specifically, the notifying unit 137 gives a notice with the content thereof corresponding to the trouble prediction result.

For example, the notifying unit 137 acquires a device ID of the prediction target image forming apparatus extracted by the predicting unit 135 from the first storage unit 121, and further acquires a mail address of the maintenance staff associated with the device ID of the management target image forming apparatus that matches the device ID of the prediction target image forming apparatus from the fourth storage unit 127. The notifying unit 137 then sends, to the acquired mail address, mail notifying the maintenance staff of the trouble possibility of the prediction target image forming apparatus extracted by the predicting unit 135.

Figure 9:
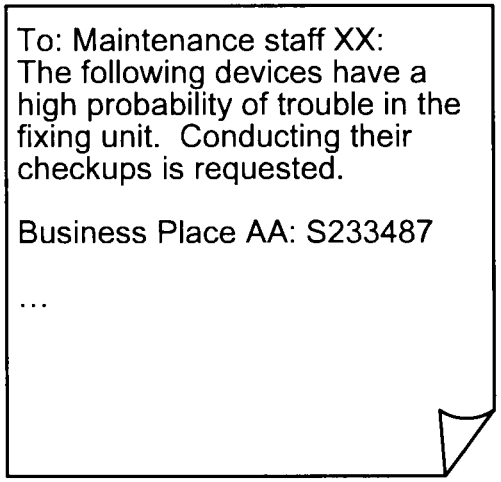
FIG. 9 is a diagram illustrating an example of mail content in the first embodiment.

At this time, the notifying unit 137 differentiates the content of mail depending on an extraction condition of the predicting unit 135. FIGS. 7 to 9 are diagrams illustrating examples of mail content in the first embodiment. The example illustrated in FIG. 7 is the mail content when the extraction condition of the predicting unit 135 is to extract the prediction target image forming apparatuses having the accumulated trouble occurrence probability of approximately 70 percent (for example, 69 percent to 71 percent), and the content suggests conducting a checkup. The example illustrated in FIG. 8 is the mail content when the extraction condition of the predicting unit 135 is to extract the prediction target image forming apparatuses having the accumulated trouble occurrence probability of approximately 85 percent (for example, 84 percent to 86 percent), and the content recommends conducting a checkup. The example illustrated in FIG. 9 is the mail content when the extraction condition of the predicting unit 135 is to extract the prediction target image forming apparatuses having the accumulated trouble occurrence probability of approximately 95 percent (for example, 94 percent to 96 percent), and the content requests the maintenance staff to conduct a checkup.

The maintenance staff terminal 150 is a terminal device for a maintenance staff installed in a maintenance center, and is used for receiving mail and such for the maintenance staff. The maintenance staff terminal 150, as illustrated in FIG. 1, includes a communication unit 152, a display unit 154, and a controller 160.

The communication unit 152 communicates with an external device such as the trouble prediction apparatus 110 via the network 101 and, similarly to the trouble prediction apparatus 110, can be implemented by an existing communication device.

The display unit 154 displays various screens and, similarly to the trouble prediction apparatus 110, can be implemented by an existing display device.

The controller 160 controls the respective units of the maintenance staff terminal 150 and, similarly to the trouble prediction apparatus 110, can be implemented by an existing control device. The controller 160 includes a receiving unit 162 and a display control unit 164.

The receiving unit 162 receives a notice based on the trouble prediction result from the trouble prediction apparatus 110.

The display control unit 164 displays the notice received by the receiving unit 162 to the display unit 154.

Next, the operation of the trouble prediction system in the embodiment will be described.

Figure 10:
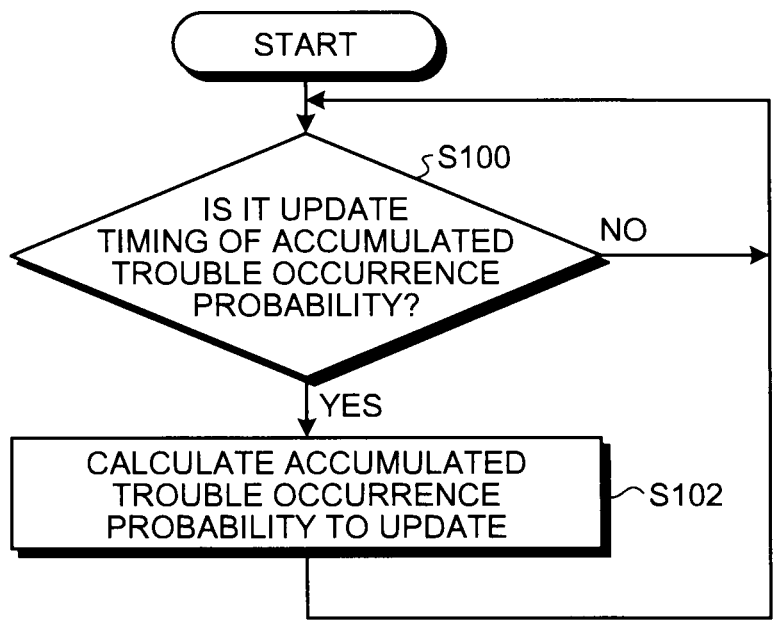
FIG. 10 is a flowchart illustrating an example of an accumulated trouble occurrence probability calculating process performed by the trouble prediction system in the first embodiment.

FIG. 10 is a flowchart illustrating an example of an accumulated trouble occurrence probability calculating process performed by the trouble prediction system 100 in the first embodiment.

The calculating unit 133 first determines whether it is an update timing of an accumulated trouble occurrence probability with respect to the number of installation days (Step S100). The update timing is given, for example, at regular intervals from the startup time of the trouble prediction apparatus 110.

When it is determined that it is the update timing of an accumulated trouble occurrence probability (Yes at Step S100), the calculating unit 133 uses a trouble-occurred date and an installation date of each of a plurality of trouble-occurred image forming apparatuses, whose model and trouble type match with one another, so as to calculate the number of non-trouble days to trouble occurrence for each of the trouble-occurred image forming apparatuses, and uses each of the calculated number of non-trouble days to calculate an accumulated trouble occurrence probability with respect to the number of installation days. The calculating unit 133 then updates the accumulated trouble occurrence probability in the third storage unit 125 associated with the model information and the trouble type information to the calculated accumulated trouble occurrence (Step S102).

When it is determined that it is not the update timing of an accumulated trouble occurrence probability (No at Step S100), the calculating unit 133 does not update the accumulated trouble occurrence probability.

Figure 11:
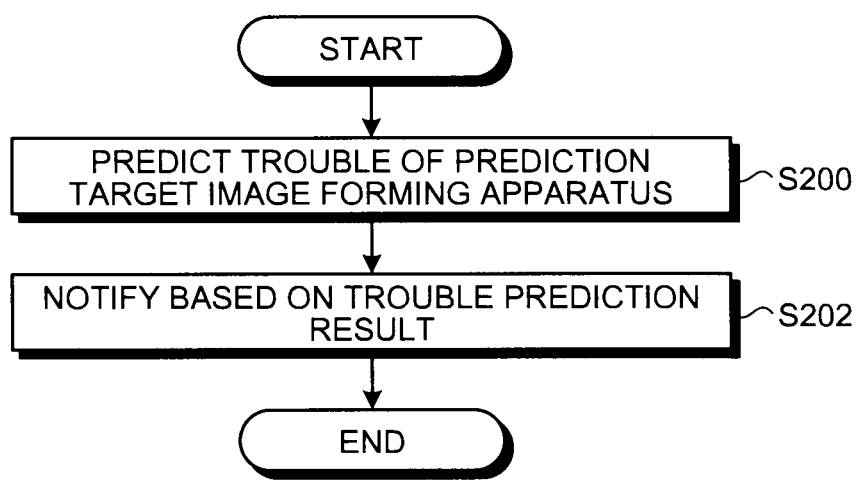
FIG. 11 is a flowchart illustrating an example of a trouble predicting process performed by the trouble prediction system in the first embodiment.

FIG. 11 is a flowchart illustrating an example of a trouble predicting process performed by the trouble prediction system 100 in the first embodiment.

The predicting unit 135 first calculates the number of installation days of the prediction target image forming apparatus at the trouble-prediction date of the prediction target image forming apparatus from the installation date of the prediction target image forming apparatus, and applies the calculated number of installation days to the accumulated trouble occurrence probability calculated by the calculating unit 133 to predict a trouble of the prediction target image forming apparatus (Step S200).

Subsequently, the notifying unit 137 gives a notice based on the trouble prediction result by the predicting unit 135 (Step S202).

As described in the foregoing, in the first embodiment, a trouble of a prediction target image forming apparatus is predicted by performing a regression model analysis using the trouble information (ticket) issued by a maintenance staff (service representative) when repairing a trouble of a trouble-occurred image forming apparatus. Consequently, according to the first embodiment, a trouble can be predicted without incorporating any hardware for trouble detection in an image forming apparatus.

Second Embodiment

Typically, image forming apparatuses such as printers, copying machines, MFPs, and facsimiles count and store the total number of print pages (counter value). In a second embodiment, therefore, explained will be an example of converting a non-trouble period of a trouble-occurred image forming apparatus to an estimated total number of print pages using the total number of print pages thereof to calculate an accumulated trouble occurrence probability. In the following, the difference to the first embodiment is mainly explained, and for the constituents having the same functions as those in the first embodiment, the same names and reference numerals as those in the first embodiment are given and their explanations are omitted.

Figure 12:
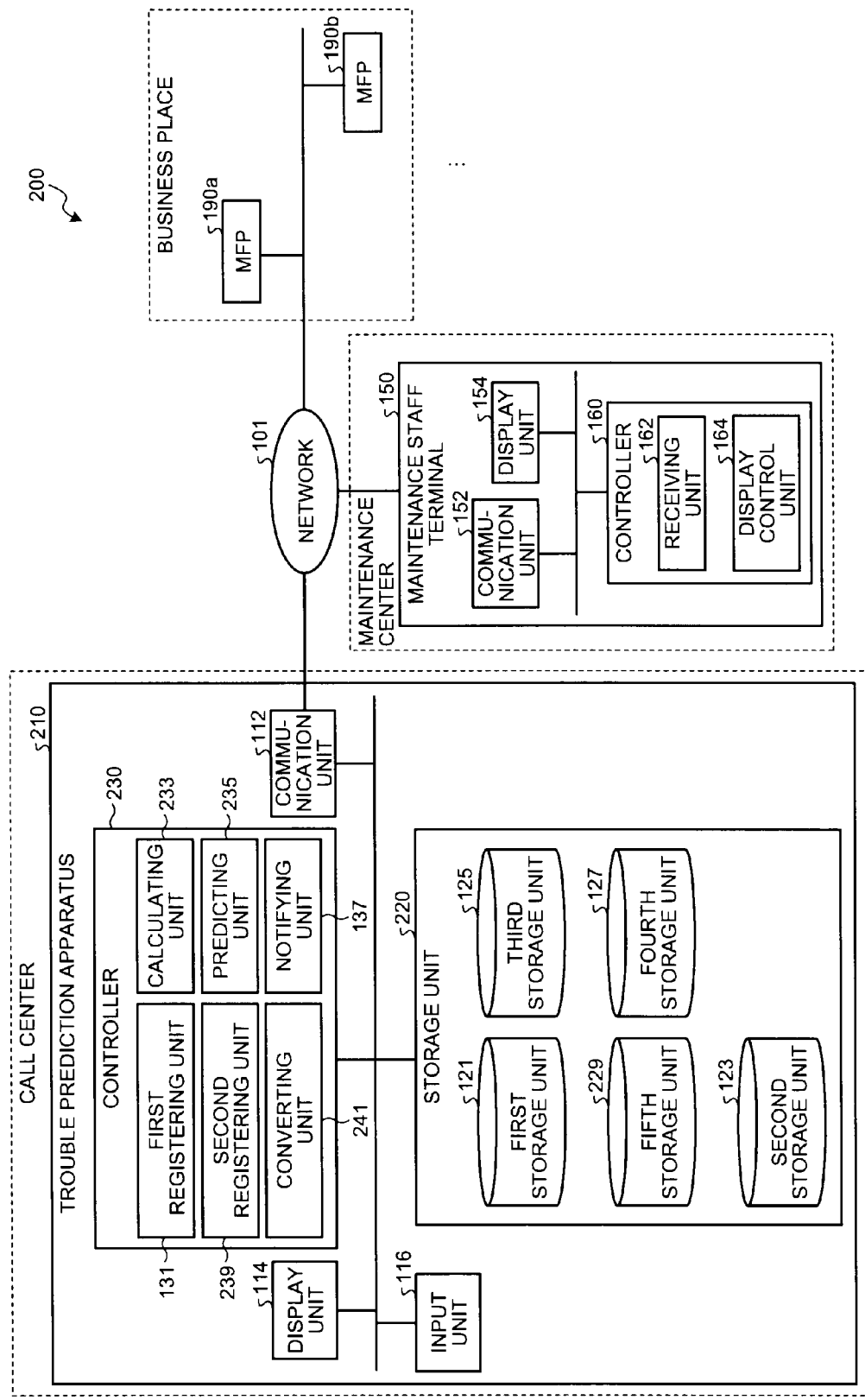
FIG. 12 is a schematic block diagram illustrating an example of a configuration of a trouble prediction system according to a second embodiment of the present invention.

FIG. 12 is a schematic block diagram illustrating an example of a configuration of a trouble prediction system 200 in the second embodiment. In the trouble prediction system 200 in the second embodiment, as illustrated in FIG. 12, that the MFPs 190a and 190b installed in a business place are connected to the network 101 and are able to communicate with a trouble prediction apparatus 210 is different from the first embodiment. In the example illustrated in FIG. 12, the MFPs 190a and 190b installed in a single business place are depicted. However, a plurality of image forming apparatuses installed in a plurality of business places are able to communicate with the trouble prediction apparatus 210 in practice.

Each of the MFPs 190a and 190b counts the total number of print pages (counter value) and periodically notifies the trouble prediction apparatus 210 of the total number of print pages with the device identification information thereof. More specifically, each of the MFPs 190a and 190b notifies the trouble prediction apparatus 210 of the total number of print pages with the device ID thereof.

The trouble prediction apparatus 210 is different from the first embodiment in that: a storage unit 220 further includes a fifth unit 229; and a controller 230 further includes a second registering unit 239 and a converting unit 241. Further, the contents of the processes of a calculating unit 233 and a predicting unit 235 are different from those of the calculating unit 133 and the predicting unit 135, respectively.

Figures 13, 14:
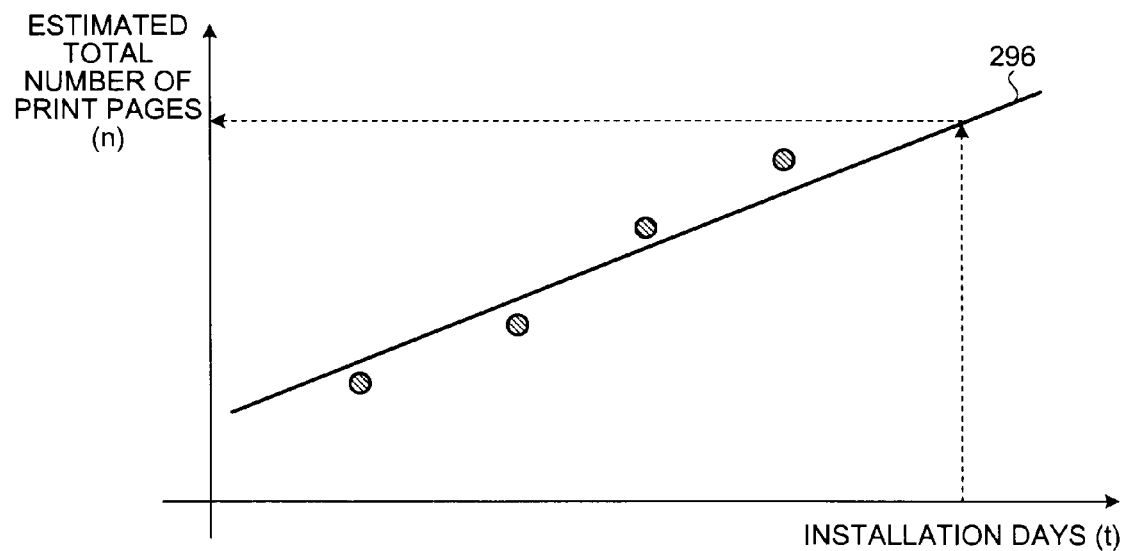
FIG. 13 is a diagram illustrating an example of total print page information in the second embodiment.
FIG. 14 is a graph illustrating an example of a regression line in the second embodiment.

The fifth storage unit 229 stores therein total print page information in which the total number of print pages and transmission time information indicative of a point of time at which the total number of print pages is transmitted are associated with the device identification information of each of a plurality of management target image forming apparatuses. FIG. 13 is a diagram illustrating an example of the total print page information in the second embodiment. In the example illustrated in FIG. 13, the total print page information includes a device ID, the total number of print pages, and a transmission date (an example of transmission time information) so as to be associated with to one another.

The second registering unit 239 receives device identification information of a management target image forming apparatus as well as information about the total number of print pages from the management target image forming apparatus, and registers the transmission date as the transmission time information together with the total number of print pages thus received so as to be associated with the device identification information stored in the second registering unit 239 that matches the received device identification information.

More specifically, the second registering unit 239 periodically requests a management target image forming apparatus via the communication unit 112 to transmit the information about the total number of print pages. Each time the device ID of the management target image forming apparatus and the information about the total number of print pages are received from the management target image forming apparatus via the communication unit 112, the second registering unit 239 registers the transmission date as the transmission time information together with the total number of print pages thus received so as to be associated with the device ID in the second registering unit 239 that matches the received device ID.

The converting unit 241 uses the installation time information, the total number of print pages, and transmission time information of each of a plurality of management target image forming apparatuses to convert a non-trouble period up to trouble occurrence for each of a plurality of trouble-occurred image forming apparatuses to an estimated total number of print pages. More specifically, the converting unit 241 uses the trouble occurrence time information of each of the trouble-occurred image forming apparatuses and the installation time information corresponding to the device identification information to calculate the non-trouble period for each of the trouble-occurred image forming apparatuses. The converting unit 241 further uses the installation time information and the transmission time information corresponding to the device identification information of each of the trouble-occurred image forming apparatuses to calculate an installation period up to transmission of the total number of print pages for each of the trouble-occurred image forming apparatuses at each time when the total number of print pages is transmitted, and uses each of the calculated installation periods and each of the total number of print pages to calculate a conversion reference for each of the trouble-occurred image forming apparatuses. The converting unit 241 then uses each of the calculated conversion references to convert each of the non-trouble periods to an estimated total number of print pages. While the converting unit 241 calculates a regression line as the conversion reference in the embodiment, it is not restricted thereto.

The conversion method of converting a non-trouble period to an estimated total number of print pages in the embodiment will be specifically explained below.

To calculate a conversion reference, the converting unit 241 acquires a device ID of a trouble-occurred image forming apparatus from the second storage unit 123, acquires an installation date associated with the device ID of the management target image forming apparatus that matches the device ID of the trouble-occurred image forming apparatus from the first storage unit 121, and acquires the total number of print pages and a transmission date of the total number of print pages associated with the device ID of the management target image forming apparatus that matches the device ID of the trouble-occurred image forming apparatus from the total printing information registering unit 239. The converting unit 241 then carries out the following computation to calculate the conversion reference for each trouble-occurred image forming apparatus specified by the device ID.

The converting unit 241 first uses the installation date and the transmission date of each of the trouble-occurred image forming apparatuses to calculate the number of installation days (an example of the installation period up to transmission of the total number of print pages) from the installation date to transmission date of the total number of print pages for each of the trouble-occurred image forming apparatuses at each time when the total number of print pages is transmitted.

Subsequently, the converting unit 241 plots the total number of print pages for each of the number of installation days up to the transmission of the total number of print pages. The converting unit 241 then calculates a regression line that most appropriately fits the plots of the number of installation days and the total number of print pages.

The converting unit 241 then acquires a device ID and a trouble-occurred date of a trouble-occurred image forming apparatus from the second storage unit 123, and further acquires an installation date associated with the device ID of the management target image forming apparatus that matches the device ID of the trouble-occurred image forming apparatus from the first storage unit 121.

The converting unit 241 calculates the number of non-trouble days from the installation to trouble occurrence as the number of installation days for each of the trouble-occurred image forming apparatuses based on the installation date and the trouble-occurred date of each of the trouble-occurred image forming apparatuses. The converting unit 241 then applies the calculated number of installation days to the calculated regression line to convert the number of installation days to an estimated total number of print pages.

FIG. 14 is a graph illustrating an example of a regression line 296 in the second embodiment. In the example illustrated in FIG. 14, the regression line 296 calculated by the converting unit 241 is expressed by Expression (2).

$$n = dt + e \qquad (2)$$

Alphabets d and e above represent coefficients. In this case, the converting unit 241 applies the number of installation days to the regression line 296, in other words, specifies the value of a variable t, so as to calculate the value of n that is the estimated total number of print pages, whereby the number of installation days is converted to the estimated total number of print pages.

The calculating unit 233 uses each of the estimated total numbers of print pages converted by the converting unit 241 to calculate a trouble occurrence probability. More specifically, the calculating unit 233 uses each of the estimated total printed numbers converted by the converting unit 241 to calculate the accumulated trouble occurrence probability with respect to the total number of print pages. Because the method of calculating the accumulated trouble occurrence probability with respect to the total number of print pages is the same as that in the first embodiment except for the number of installation days (the number of non-trouble days) being substituted by the total number of print pages (the estimated total number of print pages), its explanation is omitted.

Figure 15:
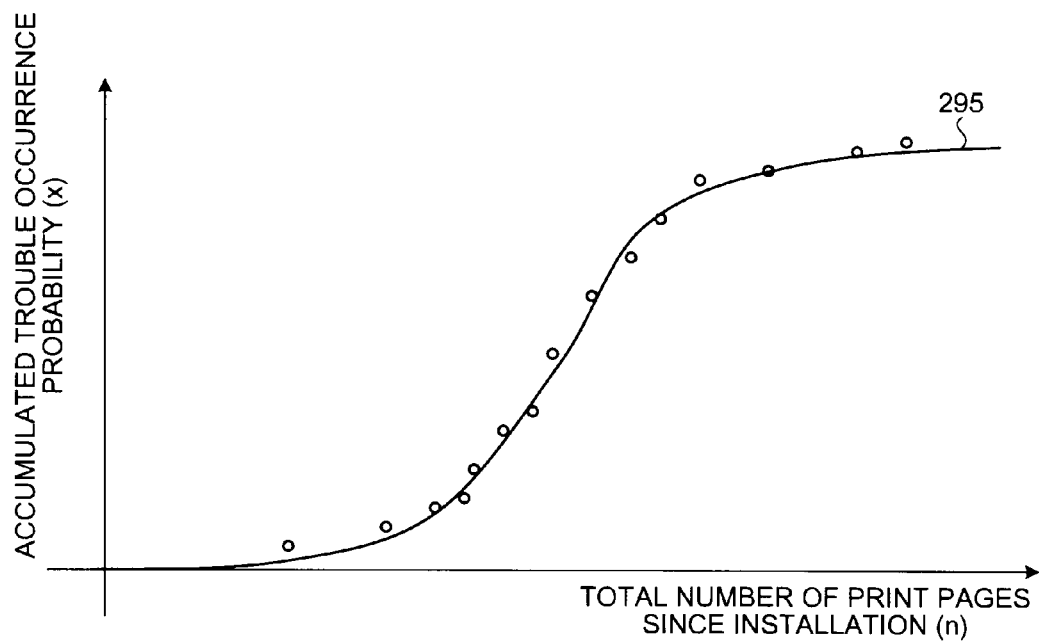
FIG. 15 is a graph illustrating an example of a logistic curve in the second embodiment.

FIG. 15 is a graph illustrating an example of a logistic curve 295 in the second embodiment. In the example illustrated in FIG. 15, the logistic curve 295 calculated by the calculating unit 233 is expressed by Expression (1) as the same as the first embodiment.

In this case, the calculating unit 233 registers the model information and the trouble type information to the third storage unit 125 so as to be associated with the coefficients a, b, and c of the logistic curve 295.

The predicting unit 235 applies the total number of print pages of a prediction target image forming apparatus to the accumulated trouble occurrence probability to predict a trouble of the prediction target image forming apparatus. Because the trouble prediction method of the prediction target image forming apparatus is the same as that in the first embodiment except for the number of installation days of the prediction target image forming apparatus being substituted by the total number of print pages, its explanation is omitted.

Figure 16:
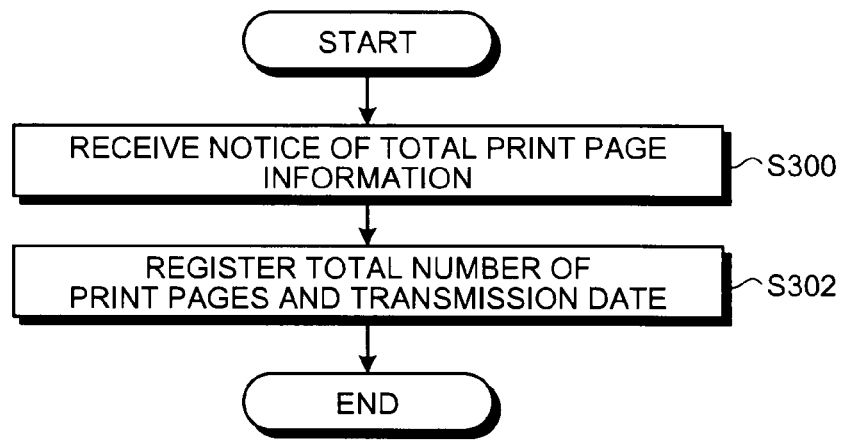
FIG. 16 is a flowchart illustrating an example of a total printing information registering process performed by the trouble prediction system in the second embodiment.

FIG. 16 is a flowchart illustrating an example of a total printing information registering process performed by the trouble prediction system 200 in the second embodiment.

The second registering unit 239 first receives a notice of a device ID and the total number of print pages as the total print page information of a management target image forming apparatus from the management target image forming apparatus (Step S300).

The second registering unit 239 then registers, as the transmission date, a point of time at which the total print page information is transmitted, together with the received total number of print pages so as to be associated with the device ID stored in the second registering unit 239 that matches the received device ID (Step S302).

Figure 17:
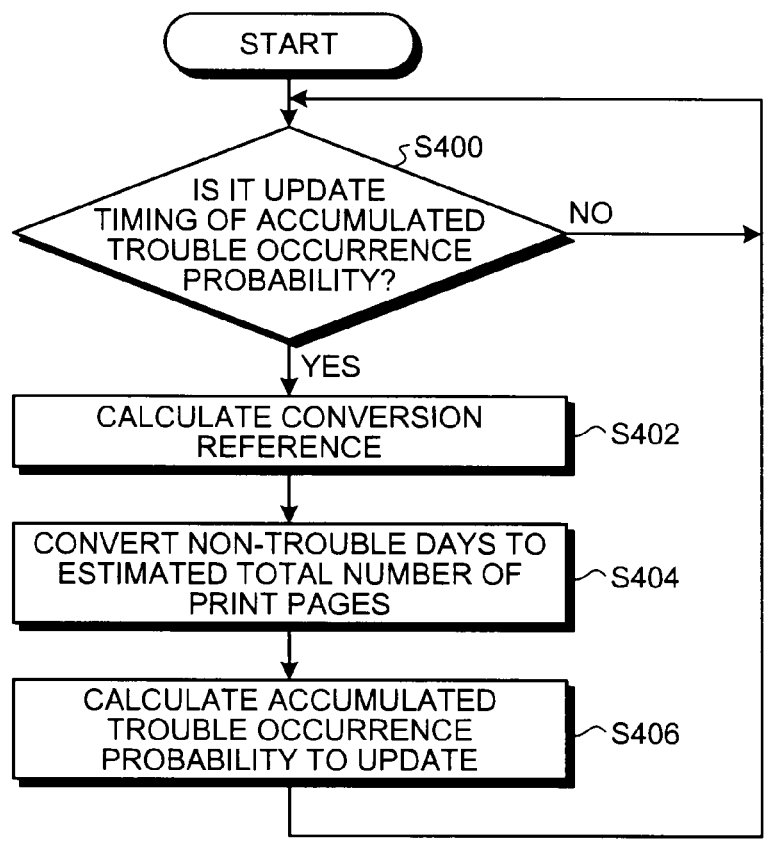
FIG. 17 is a flowchart illustrating an example of an accumulated trouble occurrence probability calculating process performed by a trouble prediction system 200 in the second embodiment.

FIG. 17 is a flowchart illustrating an example of an accumulated trouble occurrence probability calculating process performed by the trouble prediction system 200 in the second embodiment.

The converting unit 241 first determines whether it is an update timing of an accumulated trouble occurrence probability with respect to the total number of print pages (Step S400). The update timing is given, as the same as the first embodiment, for example, at regular intervals from the startup time of the trouble prediction apparatus 210.

When it is determined that it is the update timing of an accumulated trouble occurrence probability (Yes at Step S400), the converting unit 241 uses the installation date and the transmission date corresponding to the device ID of each of the trouble-occurred image forming apparatuses to calculate the number of installation days until the transmission date for each of a plurality of the trouble-occurred image forming apparatuses at each time when the total number of print pages is transmitted, and uses the calculated number of installation days and the total number of print pages to calculate a conversion reference for each of the trouble-occurred image forming apparatuses (Step S402).

The converting unit 241 then uses the trouble-occurred date of each of the trouble-occurred image forming apparatuses and the installation date corresponding to the device ID to calculate the number of non-trouble days of each of the trouble-occurred image forming apparatuses, and uses the calculated conversion reference of each of the trouble-occurred image forming apparatuses to convert the number of non-trouble days to an estimated total number of print pages of each of the trouble-occurred image forming apparatuses (Step S404).

The calculating unit 233 then uses the estimated total number of print pages of each of the trouble-occurred image forming apparatuses, whose model and trouble type match with one another, so as to calculate the accumulated trouble occurrence probability with respect to total number of print pages, and updates the accumulated trouble occurrence probability in the third storage unit 125 associated with the model information and the trouble type information with the calculated accumulated trouble occurrence probability (Step S406).

When it is determined that it is not the update timing of an accumulated trouble occurrence probability (No at Step S400), the converting unit 241 does not perform the calculation of conversion references.

As for the trouble predicting process, because it is the same as that in the first embodiment except for the number of installation days of the prediction target image forming apparatus being substituted by the total number of print pages, its explanation is omitted.

As described in the foregoing, in the second embodiment, in addition to the trouble information (ticket) issued by a maintenance staff (service representative) when repairing a trouble of a trouble-occurred image forming apparatus, a regression model analysis using each of the total number of print pages collected from the management target image forming apparatuses is performed to predict a trouble of a prediction target image forming apparatus. Consequently, in accordance with the second embodiment, trouble prediction can be made with respect to the total number of print pages, and thus a trouble can be predicted with high accuracy without incorporating any hardware for trouble detection in an image forming apparatus.

Hardware Configuration

An example of a hardware configuration of the trouble prediction apparatus in each of the above-described embodiments will be described. The trouble prediction apparatuses in the respective embodiments include a control device such as a CPU, a storage device such as a ROM and a RAM, an external storage device such as an HDD, a display device such as a display, an input device such as a keyboard and a mouse, and a communication device such as a communication interface, and is hardware configured using a normal computer.

The trouble prediction program executed by the trouble prediction apparatus in the respective embodiments is provided as a file in an installable format or in an executable format stored in a computer-readable storage medium such as a CD-ROM, a CD-R, a memory card, a digital versatile disk (DVD), and a flexible disk (FD).

The trouble prediction program executed by the trouble prediction apparatuses in the respective embodiments may be provided, by storing the trouble prediction program in a computer connected to a network such as the Internet, to be downloaded via the network. Furthermore, the trouble prediction program executed in the trouble prediction apparatuses in the respective embodiments may be provided or distributed via a network such as the Internet. Moreover, the trouble prediction program executed in the trouble prediction apparatuses in the respective embodiments may be provided embedded in a ROM or the like in advance.

The trouble prediction program executed by the trouble prediction apparatuses in the respective embodiments is modularly configured to implement the respective units described above on a computer. As actual hardware, the CPU reads out the trouble prediction program from the HDD into the RAM and executes the trouble prediction program to implement the respective units described above on the computer.

Modifications

The present invention is not limited to the above-described embodiments, and various modifications can be made.

For example, in each of the above-described embodiments, an example of calculating an accumulated trouble occurrence probability based on the number of installation days with reference to the installation date of an image forming apparatus in a business place is explained. However, the accumulated trouble occurrence probability may be calculated, for example, based on a previous trouble-occurred date. This is suitable, for example, when predicting a shortage of toner or a shortage of paper.

Furthermore, in each of the foregoing embodiments, exemplified is the trouble prediction apparatus managing the image forming apparatuses and predicting troubles of the image forming apparatuses to be managed. However, it is not limited as such, and the apparatus to be managed may be any devices as long as they are of electronic devices.

Moreover, the registration of the management target image forming apparatuses is exemplified to be manually registered by an operator in each of the foregoing embodiments. However, the registration may be automatic as in the registration of total print page information.

In the second embodiment, an example of an MFP itself counting the total number of print pages is explained. However, a device that counts the total number of print pages of an image forming apparatus may be installed in a business place and the device may give a notice to the trouble prediction apparatus by counting the total number of print pages of the image forming apparatus.

According to the present invention, a trouble can be predicted without incorporating any hardware for trouble detection in a device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A trouble prediction apparatus comprising:
a trouble-occurred device information storage unit that stores therein trouble occurrence information of trouble-occurred devices in which a trouble has occurred out of a plurality of management target devices;
a calculating unit that calculates a trouble occurrence probability based on the trouble occurrence information;
a predicting unit that predicts a trouble of a prediction target device out of the management target devices by referring to the trouble occurrence probability; and
a management target device information storage unit that stores therein management target device information in which device identification information uniquely identifying each of the management target devices is associated with installation information of a corresponding one of the management target devices,
wherein:
the trouble-occurred device information storage unit stores therein the trouble occurrence information so as to be associated with device identification information uniquely identifying each of the trouble-occurred devices,
the calculating unit calculates the trouble occurrence probability based on the trouble occurrence information of the trouble-occurred device and the installation information corresponding to the device identification information, the trouble occurrence information includes trouble occurrence time information indicative of a trouble occurrence time, and the installation information includes installation time information indicative of an installation time.

2. The trouble prediction apparatus according to claim 1, wherein the calculating unit uses the trouble occurrence time information of each of the trouble-occurred devices and the installation time information corresponding to the device identification information to calculate a non-trouble period up to trouble occurrence for each of the trouble-occurred devices, and uses each of the calculated non-trouble periods to calculate an accumulated trouble occurrence probability with respect to the installation period, and the predicting unit calculates an installation period of the prediction target device at a time of trouble prediction from the installation time information of the prediction target device, and applies the calculated installation period to the accumulated trouble occurrence probability so as to predict a trouble of the prediction target device.

3. The trouble prediction apparatus according to claim 1, wherein the management target device is an image forming apparatus, the trouble prediction apparatus further comprises:

a total print page information storage unit that stores therein total print page information in which a total number of print pages and transmission time information indicative of a point of time at which the total number of print pages is transmitted are associated with the device identification information of each of the management target devices; and a converting unit that uses the installation time information, the total number of print pages, and the transmission time information of each of the management target devices to convert a non-trouble period up to trouble occurrence for each of the trouble-occurred devices to an estimated total number of print pages, and the calculating unit uses each of the converted estimated total number of print pages to calculate the trouble occurrence probability.

4. The trouble prediction apparatus according to claim 3, wherein the converting unit uses the trouble occurrence time information of each of the trouble-occurred devices and the installation time information corresponding to the device identification information to calculate the non-trouble period for each of the trouble-occurred devices, uses the installation time information and the transmission time information corresponding to the device identification information of each of the trouble-occurred devices to calculate an installation period up to transmission of the total number of print pages for each of the trouble-occurred devices at each time when the total number of print pages is transmitted, uses each of the calculated installation periods and each of the total number of print pages to calculate a conversion reference for each of the trouble-occurred devices, and uses each of the calculated conversion references to convert each of the non-trouble periods to the estimated total number of print pages, the calculating unit uses each of the estimated total number of print pages thus converted to calculate an accumulated trouble occurrence probability with respect to the total number of print pages, and the predicting unit applies the total number of print pages of the prediction target device to the accumulated trouble occurrence probability to predict a trouble of the prediction target device.

5. The trouble prediction apparatus according to claim 3, further comprising a total print page information registering unit that receives the device identification information and information about the total number of print pages from the management target device, and registers the point of time at which the total number of print pages is transmitted as the transmission time information together with the total printed number thus received so as to be associated with the device identification information in the total print page information storage unit that matches the received device identification information.

6. The trouble prediction apparatus according to claim 1, further comprising a notifying unit that gives a notice based on a trouble prediction result by the predicting unit to a terminal of a maintenance staff.

7. The trouble prediction apparatus according to claim 6, wherein the notifying unit gives a notice whose content corresponds to the trouble prediction result.

8. The trouble prediction apparatus according to claim 6, wherein the management target device information storage unit further stores therein model information indicative of a model of the management target device so as to be associated with the device identification information of the management target device, the trouble-occurred device information storage unit further stores therein the model information of the trouble-occurred device so as to be associated with the device identification information of the trouble-occurred device, the calculating unit further calculates, for each model, the trouble occurrence probability based on the model information of the trouble-occurred device, and the predicting unit refers to the trouble occurrence probability of the model specified by the model information of the prediction target device to predict a trouble of the prediction target device.

9. The trouble prediction apparatus according to claim 6, wherein the trouble-occurred device information storage unit further stores therein trouble type information indicative of a trouble type of the trouble-occurred device so as to be associated with the device identification information of the trouble-occurred devices, the calculating unit further calculates, for each trouble type, the trouble occurrence probability based on the trouble type information of the trouble-occurred device, and the predicting unit refers to the trouble occurrence probability of the trouble type of the prediction target device to predict a trouble of the trouble-predicted device.

10. The trouble prediction apparatus according to claim 6, further comprising:

a trouble-occurred device information registering unit that receives an input of the device identification information and the trouble occurrence information of the trouble-occurred device, and registers the device identification information and the trouble occurrence information thus received to the trouble-occurred device information storage unit so as to be linked to each other, wherein the calculating unit calculates the trouble occurrence probability periodically.

11. The trouble prediction apparatus according to claim 1, wherein the management target device information storage unit further stores therein model information indicative of a model of the management target device so as to be associated with the device identification information of the management target device, the trouble-occurred device information storage unit further stores therein the model information of the trouble-occurred device so as to be associated with the device identification information of the trouble-occurred device, the calculating unit further calculates, for each model, the trouble occurrence probability based on the model information of the trouble-occurred device, and the predicting unit refers to the trouble occurrence probability of the model specified by the model information of the prediction target device to predict a trouble of the prediction target device.

12. The trouble prediction apparatus according to claim 1, wherein the trouble-occurred device information storage unit further stores therein trouble type information indicative of a trouble type of the trouble-occurred device so as to be associated with the device identification information of the trouble-occurred devices, the calculating unit further calculates, for each trouble type, the trouble occurrence probability based on the trouble type information of the trouble-occurred device, and the predicting unit refers to the trouble occurrence probability of the trouble type of the prediction target device to predict a trouble of the trouble-predicted device.

13. The trouble prediction apparatus according to claim 1, further comprising:

a trouble-occurred device information registering unit that receives an input of the device identification information and the trouble occurrence information of the trouble-occurred device, and registers the device identification information and the trouble occurrence information thus received to the trouble-occurred device information storage unit so as to be linked to each other, wherein the calculating unit calculates the trouble occurrence probability periodically.

14. The trouble prediction apparatus according to claim 1, wherein the management target device is an image forming apparatus.

15. A trouble prediction method performed in a trouble prediction apparatus that includes a trouble-occurred device information storage unit, a management target device information storage unit, a calculation unit, and a predicting unit, the method comprising:

acquiring, by the calculating unit, trouble occurrence information from the trouble-occurred device information storage unit that stores therein the trouble occurrence information of trouble-occurred devices in which a trouble has occurred out of a plurality of management target devices;

calculating, by the calculating unit, a trouble occurrence probability based on the trouble occurrence information; and predicting, by the predicting unit, a trouble of a prediction target device out of the management target devices by referring to the trouble occurrence probability, wherein:

the management target device information storage unit stores therein management target device information in which device identification information uniquely identifying each of the management target devices is associated with installation information of a corresponding one of the management target devices, the trouble-occurred device information storage unit stores therein the trouble occurrence information so as to be associated with device identification information uniquely identifying each of the trouble-occurred devices, the trouble occurrence information includes trouble occurrence time information indicative of a trouble occurrence time, the installation information includes installation time information indicative of an installation time, and the calculating calculates the trouble occurrence probability based on the trouble occurrence information of the trouble-occurred device and the installation information corresponding to the device identification information.

16. A computer program product comprising a non-transitory computer-readable medium including computer-readable program codes embodied in the medium for predicting a trouble of a device, the program codes, when executed by a computer, causing the computer to execute:

acquiring trouble occurrence information from a trouble-occurred device information storage unit that stores therein the trouble occurrence information of trouble-occurred devices in which a trouble has occurred out of a plurality of management target devices;

calculating a trouble occurrence probability based on the trouble occurrence information; and predicting a trouble of a prediction target device out of the management target devices by referring to the trouble occurrence probability, wherein:

a management target device information storage unit stores therein management target device information in which device identification information uniquely identifying each of the management target devices is associated with installation information of a corresponding one of the management target devices, the trouble-occurred device information storage unit stores therein the trouble occurrence information so as to be associated with device identification information uniquely identifying each of the trouble-occurred devices, the trouble occurrence information includes trouble occurrence time information indicative of a trouble occurrence time, the installation information includes installation time information indicative of an installation time, and the calculating calculates the trouble occurrence probability based on the trouble occurrence information of the trouble-occurred device and the installation information corresponding to the device identification information.

* * * * *